United States Patent
Duesel, Jr. et al.

(10) Patent No.: US 7,832,714 B2
(45) Date of Patent: Nov. 16, 2010

(54) DESALINATION SYSTEM

(75) Inventors: Bernard F. Duesel, Jr., Goshen, NY (US); Michael J. Rutsch, Tulsa, OK (US)

(73) Assignee: Heartland Technology Partners LLC, Kirkwood, MO (US)

( * ) Notice: Subject to any disclaimer, the term of this patent is extended or adjusted under 35 U.S.C. 154(b) by 925 days.

(21) Appl. No.: 11/625,159

(22) Filed: Jan. 19, 2007

(65) Prior Publication Data

US 2008/0173590 A1 Jul. 24, 2008

(51) Int. Cl.
*B01F 3/04* (2006.01)

(52) U.S. Cl. .......................... 261/77; 261/123; 261/124; 159/29

(58) Field of Classification Search .................... 261/77, 261/121.1, 122.1, 123, 124, DIG. 9; 210/767, 210/519; 159/29
See application file for complete search history.

(56) References Cited

U.S. PATENT DOCUMENTS

| | | | |
|---|---|---|---|
| 2,387,818 A | * 10/1945 | Wethly | ........................ 422/241 |
| 2,468,455 A | * 4/1949 | Metziger | ................... 23/302 R |
| 2,790,506 A | 4/1957 | Vactor | |
| 2,867,972 A | 1/1959 | Holderreed et al. | |
| 2,879,838 A | 3/1959 | Flynt et al. | |
| 2,890,166 A | 6/1959 | Heinze | |
| 2,981,250 A | 4/1961 | Steward | |

(Continued)

FOREIGN PATENT DOCUMENTS

CL 757-2004 3/2010

(Continued)

OTHER PUBLICATIONS

International Preliminary Report on Patentability for Application No. PCT/US2007/001487, dated Jul. 21, 2009.

(Continued)

*Primary Examiner*—Scott Bushey
(74) *Attorney, Agent, or Firm*—Marshall, Gerstein & Borun LLP

(57) ABSTRACT

A desalination system in the form of a submerged gas evaporator that includes a vessel, a gas delivery tube partially disposed within the vessel to deliver a gas into the vessel and a fluid inlet that provides a fluid to the vessel at a rate sufficient to maintain a controlled constant level of fluid within the vessel. A weir is disposed within the vessel adjacent the gas delivery tube to form a first fluid circulation path between a first weir end and a wall of the vessel and a second fluid circulation path between a second weir end and an upper end of the vessel. During operation, gas introduced through the tube mixes with the fluid and the combined gas and fluid flow at a high rate with a high degree of turbulence along the first and second circulation paths defined around the weir, thereby promoting vigorous mixing and intimate contact between the gas and the fluid. This turbulent flow develops a significant amount of inter facial surface area between the gas and the fluid resulting in a reduction of the required residence time of the gas within the fluid to achieve thermal equilibrium which leads to a more efficient and complete evaporation. Additionally, vapor exiting the submerged gas evaporator is condensed in a condensing unit thus precipitating vapor into a liquid for removal.

29 Claims, 7 Drawing Sheets

U.S. PATENT DOCUMENTS

| | | | |
|---|---|---|---|
| 3,060,921 A | 10/1962 | Luring et al. | |
| 3,211,538 A | 10/1965 | Gross et al. | |
| 3,212,235 A | 10/1965 | Markant | |
| 3,215,189 A | 11/1965 | Bauer | |
| 3,284,064 A | 11/1966 | Kolm et al. | |
| 3,405,918 A | 10/1968 | Calaceto et al. | |
| 3,432,399 A | 3/1969 | Schutt | |
| 3,601,374 A | 8/1971 | Wheeler | |
| 3,638,924 A | 2/1972 | Calaceto et al. | |
| 3,713,786 A | 1/1973 | Umstead | |
| 3,743,483 A | 7/1973 | Shah | |
| 3,756,580 A * | 9/1973 | Dunn | 261/123 |
| 3,762,893 A * | 10/1973 | Larsen | 48/127.1 |
| 3,782,300 A * | 1/1974 | White et al. | 110/238 |
| 3,789,902 A | 2/1974 | Shah et al. | |
| 3,838,974 A | 10/1974 | Hemsath et al. | |
| 3,840,002 A | 10/1974 | Douglas et al. | |
| 3,844,748 A | 10/1974 | Lanier | |
| 3,870,585 A | 3/1975 | Kearns et al. | |
| 3,876,490 A | 4/1975 | Tsuruta | |
| 3,925,148 A | 12/1975 | Erwin | |
| 4,026,682 A | 5/1977 | Pausch | |
| 4,060,587 A | 11/1977 | Lewis | |
| 4,119,538 A | 10/1978 | Yamauchi et al. | |
| 4,230,536 A | 10/1980 | Sech | |
| 4,432,914 A | 2/1984 | Schifftner | |
| 4,648,973 A | 3/1987 | Hultholm et al. | |
| 4,683,062 A | 7/1987 | Krovak et al. | |
| 4,863,644 A | 9/1989 | Harrington et al. | |
| 4,913,065 A | 4/1990 | Hemsath | |
| 5,009,511 A | 4/1991 | Sarko et al. | |
| 5,030,428 A | 7/1991 | Dorr et al. | |
| 5,032,230 A | 7/1991 | Shepherd | |
| 5,132,090 A | 7/1992 | Volland | |
| 5,190,670 A | 3/1993 | Stearns | |
| 5,279,646 A | 1/1994 | Schwab | |
| 5,336,284 A | 8/1994 | Schifftner | |
| 5,342,482 A | 8/1994 | Duesel et al. | |
| 5,378,267 A | 1/1995 | Bros et al. | |
| 5,484,471 A | 1/1996 | Schwab | |
| 5,512,085 A | 4/1996 | Schwab | |
| 5,552,022 A | 9/1996 | Wilson | |
| 5,585,005 A | 12/1996 | Smith et al. | |
| 5,636,623 A | 6/1997 | Panz et al. | |
| 5,759,233 A | 6/1998 | Schwab | |
| 5,934,207 A | 8/1999 | Echols et al. | |
| 5,968,352 A * | 10/1999 | Ditzler | 210/220 |
| 6,007,055 A | 12/1999 | Schifftner | |
| 6,149,137 A | 11/2000 | Johnson et al. | |
| 6,293,277 B1 * | 9/2001 | Panz et al. | 126/360.2 |
| 6,383,260 B1 | 5/2002 | Schwab | |
| 6,391,100 B1 | 5/2002 | Hogan | |
| 6,402,816 B1 | 6/2002 | Trivett et al. | |
| 6,485,548 B1 | 11/2002 | Hogan | |
| 6,547,855 B1 | 4/2003 | Schmidtke | |
| 6,616,733 B1 | 9/2003 | Pellegrin | |
| 6,719,829 B1 | 4/2004 | Schwab | |
| 6,913,671 B2 | 7/2005 | Bolton et al. | |
| 7,074,339 B1 | 7/2006 | Mims | |
| 7,142,298 B2 | 11/2006 | Nuspliger | |
| 7,144,555 B1 | 12/2006 | Squires et al. | |
| 7,156,985 B1 | 1/2007 | Frisch | |
| 7,402,247 B2 | 7/2008 | Sutton | |
| 7,572,626 B2 | 8/2009 | Frisch et al. | |
| 2002/0158024 A1 | 10/2002 | Van Slyke et al. | |
| 2004/0040671 A1 | 3/2004 | Duesel et al. | |
| 2004/0045681 A1 | 3/2004 | Bolton et al. | |
| 2004/0213721 A1 | 10/2004 | Arno et al. | |
| 2007/0251650 A1 | 11/2007 | Duesel et al. | |
| 2008/0213137 A1 | 9/2008 | Frisch et al. | |

FOREIGN PATENT DOCUMENTS

| | | |
|---|---|---|
| DE | 556 455 | 8/1932 |
| DE | 11 73 429 | 7/1964 |
| FR | 2 441 817 | 6/1980 |
| GB | 383 570 | 11/1932 |
| GB | 463 770 | 4/1937 |
| WO | WO-2004/022487 | 3/2004 |

OTHER PUBLICATIONS

International Preliminary Report on Patentability for Application No. PCT/US2007/001632, dated Jul. 21, 2009.

International Preliminary Report on Patentability for Application No. PCT/US2007/001633, dated Jul. 21, 2009.

International Preliminary Report on Patentability for Application No. PCT/US2007/001634, dated Jul. 21, 2009.

A.G. Jones, *Liquid Circulation in a Draft-Tube Bubble Column*, Chemical Engineering Science, vol. 40, No. 3, pp. 449-462, 1985, Pergamon Press Ltd., Great Britain.

Hirotsugu Hattori et al., *Fluid and Solids Flow Affecting the Solids Circulation Rate in Spouted Beds with a Draft Tube*, Journal of Chemical Engineering of Japan, vol. 37, No. 9, pp. 1085-1091, 2004, Shinshu University, Japan.

M. Yoshino et al., *Removal and Recovery of Phosphate and Ammonium as Struvite from Supernatant in Anaerobic Digestion*, Water Science and Technology, vol. 48, No. 1, pp. 171-178, 2003, IWA Publishing, Japan.

D. Fox et al., *Control Mechanisms of Flulidized Solids Circulation Between Adjacent Vessels*, AIChE Journal, Dec. 1989, vol. 35, No. 12, pp. 1933-1941, Universite de Technologie de Compiegne, France.

Liang-Shih Fan et al., *Some Remarks on Hydrodynamic Behavior Of A Draft Tube Gas-Liquid-Solid Fluidized Bed*, Department of Chemical Engineering, The Ohio State University, Columbus, Ohio 43210, 2007.

N.D. Barrett et al., *The Industrial Potential And Economic Viability Of Spouted Bed Processes*, Chemeca 85, paper D4c, pp. 401-405, The Thirteenth Australasian Conference On Chemical Engineering, Perth, Australia, Aug. 1985.

J.K. Claflin, *Intraparticle Conduction Effects on the Temperature Profiles in Spouted Beds*, Chemeca 85, paper D9b, pp. 471-475, The Thirteenth Australasian Conference On Chemical Engineering, Perth, Australia, Aug. 1985.

Dawn Smith, *Sludge-U-Like, As The Ban On Sea Disposal Of Sewage Waste Looms, Technologies That Can Deliver Cleaner, Thicker And More Farmer-Friendly Sludges Are Gaining Popularity*, Water Bulletin 708, Jun. 21, 1996.

Harry Brandt, et al., *Treatment Process For Waste Water Disposal Of The "Morcinek" Mine Using Coalbed Methane*, Conference On Coalbed Methane Utilization, Oct. 5-7, 1994, Katowice, Poland.

Yutaka Miyake et al., *Performance Characteristics Of High Speed-Type Cross Flow Turbine*, 1993.

Ho-Ming Yeh et al., *Double-Pass Heat Or Mass Transfer Through A Parallel-Plate Channel with Recycle*. International Journal of Hat and Mass Transfer 43 pp. 487-491, 2000, Department of Chemical Engineering, Tamkang University, Tamisui, Taipei 251, Taiwan.

Sathyanarayana et al., *Circular C.W. Intake System—A Research Opinion*, Seventh Technical Conference of the British Pump Manufacturer's Association, paper 21, pp. 293-313, 1981.

Caridad Talbert et al., *The Elecrospouted Bed*, IEEE Transactions on Industry Applications, vol. 1A-20, No. 5, Sep./Oct. 1984, pp. 1220-1223.

Wayne J. Genck, *Guidelines for Crystallizer Selection And Operation*, CEP, Oct. 2004, pp. 26-32. www.cepmagazine.org.

M. K. Bennett et al., *Design Of A Software Application For The Simulation And Control Of Continuous And Batch Crystallizer Circuits*, Advances in Engineering Software 33, 2002, pp. 365-374, Department of Chemical and Biochemical Engineering, Faculty of Engineering Science, University of Western Ontario, London, Ont. Canada N6A 5B9.

G. A. St. Onge et al., *Start-Up, Testing, And Performance Of The First Bulb-Type Hydroelectric Project In The U.S.A.*, IEEE Transactions on Power Apparatus Systems, vol. PSA-101, No. 6, Jun. 1982, pp. 1313-1321.

Nely T. Padial et al., *Three-Dimensional Simulation Of A Three-Phase Draft-Tube Bubble Column*, Chemical Engineering Science 55 (2000), pp. 3261-3273.

J. K. Claflin et al., *The Use Of Spouted Beds For The Heat Treatment Of Grains*, Chemeca 81, The 9$^{th}$ Australasian Conference on Chemical Engineering, Christchurch, New Zealand, Aug. 30 to Sep. 4, 1981, pp. 65-72.

R. Swaminathan et al., *Some Aerodynamic Aspects of Spouted Beds of Grains*, Department of Chemical Engineering, McGill University, Montreal, Quebec, Canada, pp. 197-204, 2007.

W.A. Cross et al. *Leachate Evaporation By Using Landfill Gas*, Proceedings Sardinia 97, Sixth Landfill Symposium, S. Margherita di Pula, Cagliari, Italy, Oct. 13-17, 1997, pp. 413-422.

Z. H. Ye et al., *Removal And Distribution Of Iron, Manganese, Cobalt, And Nickel Within A Pennsylvania Constructed Wetland Treating Coal Combustion By-Product Leachate*, J. Environ. Qual. 30:1464-1473, 2001.

R. Williams et al., *Aspects Of Submerged Combustion As A Heat Exchange Method*, Trans IChemE, vol. 71, Part A, May 1993, pp. 308-309.

J. C. Mueller et al., *Rotating Disk Looks Promising for Plant Wastes*, 2007.

Kenneth Dunn, *Incineration's Role In Ultimate Disposal Of Process Wastes*, Chemical Engineering, Deskbook Issue, Oct. 6, 1975, pp. 141-150.

Harry Berg, *The Development Of The Controlled Buoyancy System For Installation Of Submerged Pipelines*, Journal AWWA, Water Technology/Quality, Mar. 1977, pp. 214-218.

Yasutoshi Shimizu et al., *Filtration Characteristics Of Hollow Fiber Microfiltration Membranes Used In Membrane Bioreactor For Domestic Wastewater Treatment*, Wat. res. vol. 30, No. 10, pp. 2385-2392, 1996.

Philip Bachand et al. *Denitrification In Constructed Free-Water Surface Wetlands: II. Effects Of Vegetation And Temperature*, Ecological Engineering 14, pp. 17-32, 2000.

M. Etzensperger et al. *Phenol Degradation In A Three-Phase Biofilm Fluidized Sand Bed Reactor*, Bioprocess Engineering 4, pp. 175-181, 1989.

G. I. Cherednichenko et al., *Disposal Of Saline Wastes From Petroleum Refineries*, All-Union Scientific-Research and Planning-Design Institute of the Petroleum Refining and Petrochemical Industry, Translated from Khimiya I Tekhnologiya Topliv I Masel, No. 9, pp. 37-39, Sep. 1974.

E. L. Durkee et al., *Field Tests Of Salt Recovery System For Spent Pickle Brine*, 2007.

Marko Hocevar et al., *The Influence Of Draft-Tube Pressure Pulsations On The Cavitation-Vortex Dynamics In A Francis Turbine*, Journal of Mechanical Engineering 49, 2003, pp. 484-498.

German Kurz, *Tauchbrenner*, Ol U. Gasfeuerung, 18 (3), 1973, pp. 171-180.

Schoene, O, "Die Entolung des Abdampfes and der Kondensate von Kolbendampfmaschinen," Braunkohle, 31:82-92 (1932).

Alabovskij et al., *Evaporation Des Eaux De Lavage De Chaudieres Dans Des Appareils A Combustion Immergee*, Promyshl. Energet, 1975 (4), pp. 38-39.

International Search Report issued in PCT/US2006/028515 mailed on Nov. 14, 2006.

Office action from Chilean Patent Application No. 238-2007, Mar. 2010.

English language translation of an office action from Chilean Patent Application No. 237-2007, Mar. 2010.

\* cited by examiner

DESALINATION SYSTEM

FIELD OF THE DISCLOSURE

The present disclosure relates generally to desalination systems and liquids, and more specifically, to desalination systems including submerged gas evaporators.

BACKGROUND

Desalination systems are systems that remove salt or other dissolved solids from water, most often to produce potable water. Currently, several methods of desalination are employed by commercial desalination systems. The most popular methods of commercial desalination are reverse osmosis and flash vaporization. Both of these methods have large energy requirements and certain components that wear out frequently. For example, reverse osmosis systems force water through membranes and these membranes become clogged and torn, thus necessitating frequent replacement. Similarly, flash vaporization systems have corrosion and erosion problems due to the spraying of hot brine within these systems. The energy requirements for a reverse osmosis system may be approximately 6 kWh of electricity per cubic meter of water, while a flash vaporization, system may require as much as 200 kWh per cubic meter of water. Due to the high energy inputs and frequent maintenance, desalination of water on a large scale basis has been relatively expensive, often more expensive than finding alternate sources of groundwater.

Submerged gas evaporator systems in which gas is dispersed into a continuous liquid phase, referred to generally herein as submerged gas evaporators, are well known types of devices used to perform evaporation processes with respect to various constituents. U.S. Pat. No. 5,342,482, the entire specification of which is hereby incorporated by reference, discloses a common type of submerged combustion gas evaporator, in which combustion gas is generated and delivered though an inlet pipe to a dispersal unit submerged within the liquid to be evaporated. The dispersal unit includes a number of spaced-apart gas delivery pipes extending radially outward from the inlet pipe, each of the gas delivery pipes having small holes spaced apart at various locations on the surface of the gas delivery pipe to disperse the combustion gas as small bubbles as uniformly as practical across the cross-sectional area of the liquid held within the processing vessel. According to current understanding within the prior art, this design provides desirable intimate contact between the liquid and the combustion gas over a large interfacial surface area while also promoting thorough agitation of the liquid within the processing vessel.

Because submerged gas evaporators disperse gas into a continuous liquid phase, these devices provide a significant advantage when compared to conventional evaporators when contact between a liquid stream and a gas stream is desirable. In fact, submerged gas evaporators are especially advantageous when the desired result is to highly concentrate a liquid stream by means of evaporation.

However, during the evaporation process, dissolved solids within the continuous liquid phase become more concentrated often leading to the formation of precipitates that are difficult to handle. These precipitates may include substances that form deposits on the solid surfaces of heat exchangers within flash vaporization systems or on the membranes of reverse osmosis systems, and substances that tend to form large crystals or agglomerates that can block passages within processing equipment, such as the gas exit holes in the system described in U.S. Pat. No. 5,342,482. Generally speaking, feed streams that cause deposits to form on surfaces and create blockages within process equipment are called fouling fluids.

Deposits of precipitated solids create chemical fouling or buildup on fill or packing within conventional desalination systems that increases available surface area and also create stagnant flow areas that leads to biological fouling of these surfaces by promoting growth of bacteria and algae. Biological growth leads to the formation of slime within a desalination system that further reduces desalination efficiency and can also foul heat exchangers within equipment which employs the circulating liquid from the desalination system as an evaporative medium.

These common problems adversely affect the efficiency and costs of conventional desalination systems in that they necessitate frequent cleaning cycles and/or the addition of chemical control agents to the evaporative fluid to avoid loss of efficiency and to avoid sudden failures within the evaporation equipment.

Additionally, most evaporation systems that rely on intimate contact between gases and liquids are prone to problems related to carryover of entrained liquid droplets that form as the vapor phase disengages from the liquid phase. For this reason, most evaporator systems that require intimate contact of gas with liquid include one or more devices to minimize entrainment of liquid droplets and/or to capture entrained liquid droplets while allowing for separation of the entrained liquid droplets from the exhaust gas flowing out of the evaporation zone. Droplets within the vapor are particularly troublesome if the process is applied to produce potable water in that the entrained droplets contain the salts, minerals and other contaminants that were in the feed liquid.

Unlike conventional evaporators where heat and mass are transferred from the liquid phase as it flows over the extended surface of the heat exchangers, heat and mass transfer within submerged gas processors lake place at the interface of a discontinuous gas phase dispersed within a continuous liquid phase and there are no solid surfaces upon which deposits can accumulate.

Submerged gas evaporators also tend to mitigate the formation of large crystals because dispersing the gas beneath the liquid surface promotes vigorous agitation within the evaporation vessel, which is a less desirable environment for crystal growth than a more quiescent zone. Further, active mixing within an evaporation vessel tends to maintain precipitated solids in suspension and thereby mitigates blockages that are related to settling and/or agglomeration of suspended solids.

However, mitigation of crystal growth and settlement is dependent on the degree of mixing achieved within a particular submerged gas evaporator, and not all submerged gas evaporator designs provide adequate mixing to prevent large crystal growth and related blockages. Therefore, while the dynamic renewable heat transfer surface area feature of submerged gas evaporators eliminates the potential for fouling liquids to coat extended surfaces, conventional submerged gas evaporators are still subject to potential blockages and carryover of entrained liquid within the exhaust gas flowing away from the evaporation zone.

SUMMARY OF THE DISCLOSURE

A desalination system includes an evaporator vessel, one or more tubes partially disposed within the evaporator vessel which are adapted to transport a gas into the interior of the evaporator vessel, an evaporative fluid inlet adapted to transport an evaporative fluid into the evaporator vessel at a rate that maintains the evaporative fluid inside the evaporator vessel at a predetermined level and an exhaust stack that allows vapor to flow away from the evaporator vessel. In addition, the desalination system evaporator includes one or more weirs that at least partially surround the tube(s) and are at least partially submerged in the evaporative fluid to create a fluid circulation path formed by the space between the weir(s) and the walls of the evaporation vessel and gas tube(s). In one embodiment, each weir is open at both ends and forms a lower circulation gap between a first one of the weir ends and a bottom wall of the evaporator vessel and an upper circulation gap between a second one of the weir ends and a normal evaporative fluid operating level.

During operation, gas introduced through the tube or tubes mixes with the evaporative fluid in a first confined volume formed by the weir or the weir and a wall of the evaporation vessel and the tube(s) and the fluid mixture of gas and liquid flows at high volume with a high degree of turbulence along the circulation path defined around the weir(s), thereby causing a high degree of mixing between the gas and the evaporative fluid and any suspended particles within the evaporative fluid. Shear forces within this two-phase or three-phase turbulent flow region that result from the high density liquid phase overrunning the low density gas phase create extensive interfacial surface area between the gas and the evaporative fluid that favors minimum residence time for mass and heat transfer between the liquid and gas phases to come to equilibrium compared to conventional gas dispersion techniques. Still further, vigorous mixing created by the turbulent flow hinders the formation of large crystals of precipitates within the evaporative fluid and, because the system does not use small holes or other ports to introduce the gas into the evaporative fluid, clogging and fouling associated with other evaporators are significantly reduced or entirely eliminated. Still further, the predominantly horizontal flow direction of the liquid and gas mixture over the top of the weir and along the surface of the evaporative fluid within the evaporation vessel enables the gas phase to disengage from the process fluid with minimal entrainment of liquid due to the significantly greater momentum of the much higher density liquid that is directed primarily horizontally compared to the low density gas with a relatively weak but constant vertical momentum component due to buoyancy.

In addition, a method of desalination using a submerged gas evaporator includes providing a evaporative fluid to an evaporator vessel of a submerged gas evaporator at a rate sufficient to maintain the evaporative fluid level at a predetermined level within the evaporator vessel, supplying a gas to the evaporator vessel, and mixing the gas and evaporative fluid within the evaporator vessel by causing the gas and evaporative fluid to flow around a weir or weirs within the submerged gas processor to thereby transfer heat energy and mass between the gas and liquid phases of a mixture.

DETAILED DESCRIPTION

The performance of desalination systems according to the disclosure depends on the moisture content and temperature of the gas and the thermodynamic properties of the evaporative fluid, which are usually ambient air and water. As with conventional desalination systems, equations developed by Merkel that are based the enthalpy potential difference between the evaporative fluid and air, may be used to closely define the performance of a desalination system that is constructed according to the invention for a particular application. Desalination systems according to the disclosure can be substituted for conventional desalination systems. Conventional means of controlling the flow of evaporative fluid through the desalination system may be employed. Likewise, conventional means of controlling desalination systems to meet the requirements of a particular desalination system application may be employed. Multiple desalination systems according to the invention may be connected in series or parallel configurations to meet the desalination demand of a particular application.

Figure 1:
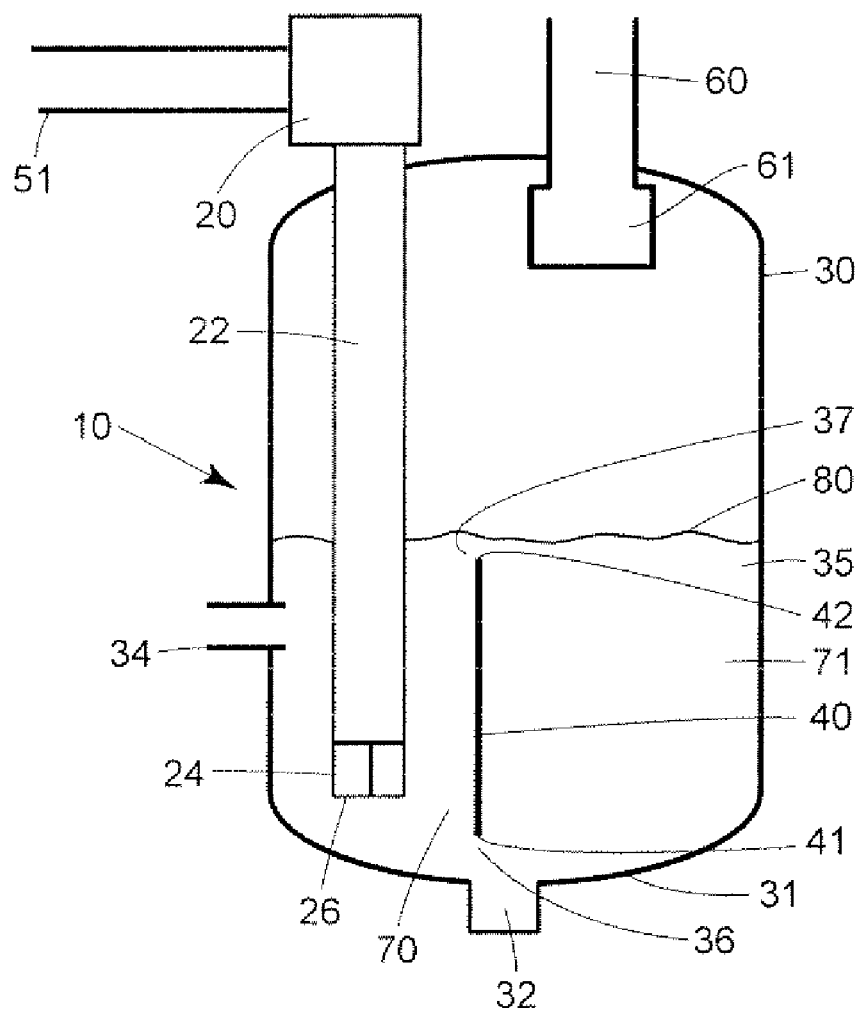
FIG. 1 is a cross-sectional view of a desalination system evaporator constructed in accordance with the teachings of the disclosure.

Referring to FIG. 1, a desalination system evaporator 10, includes a fan/blower 20 and a gas supply tube or gas inlet tube 22 having sparge or gas exit ports 24 at or near an end 26 thereof. The gas inlet tube 22 supplies gas under positive pressure to an evaporator vessel 30 having a bottom wall 31 and an evaporative fluid outlet port 32. An evaporative fluid inlet port 34 is disposed in one side of the vessel 30 and enables an evaporative fluid 35 to be provided into the interior of the evaporator vessel 30. Additionally, a weir 40, which is illustrated in FIG. 1 as a flat or solid plate member having a first or lower end 41 and a second or upper end 42, is disposed within the evaporator vessel 30 adjacent the gas inlet tube 22. Although the evaporator vessel 30 and gas inlet tube 22 are generally shown herein as cylindrical in shape, one skilled in the art will realize that many other shapes may be employed for these elements. The weir 40 defines and separates two volumes 70 and 71 within the evaporator vessel 30. As illustrated in FIG. 1, a gas exit port 60 disposed in the top of the vessel 30 enables gas (vapor) to exit from the interior of the evaporator vessel 30. Disposed near a junction of the gas exit port 60 and the evaporator vessel 30 is a demister 61. The demister 61 removes droplets of evaporative fluid that are entrained in the gas phase as the gas disengages from the liquid phase at the surface 80 of the liquid. The demister 61 may be a vane-type demister, a mesh pad-type demister, or any combination of commercially available demister elements. Further, a vane-type demister may be provided having a coalescing filter to improve demisting performance. The demister 61 may be mounted in any orientation and adapted to a particular evaporator vessel 30 including, but not limited to, horizontal and vertical orientations.

In the desalination system evaporator of FIG. 1, the fan/blower 20 is supplied with gas through a line 51. Moreover, the evaporative fluid 35 may be supplied through the fluid inlet 34 by a pump (not shown in FIG. 1) at a rate sufficient to maintain a surface 80 of the evaporative fluid 35 within the evaporator vessel 30 at a predetermined level, which may be set by a user. A level sensor and control (not shown in FIG. 1)

may be used to determine and control the rate that the evaporative fluid 35 is supplied through the inlet port 34.

As illustrated in FIG. 1, the weir 40 is mounted within the evaporator vessel 30 to form a lower circulation gap 36 between the first end 41 of the weir 40 and the bottom wall 31 of the evaporator vessel 30 and to form an upper circulation gap 37 between the second end 42 of the weir 40 and the surface 80 of the evaporative fluid 35 (or a top wall of the evaporator vessel 30). As will be understood, the upper end 42 of the weir 40 is preferably set to be at or below the surface level 80 of the evaporative fluid 35 when the evaporative fluid 35 is at rest (i.e., when no gas is being introduced into the evaporator vessel 30 via the gas inlet tube 22). As illustrated in FIG. 1, the weir 40 also defines and separates the confined volume or space 70 in which the sparge ports 24 are located from the volume or space 71. If desired, the weir 40 may be mounted to the evaporator vessel 30 via welding, bolts or other fasteners attached to internal side walls of the evaporator vessel 30.

During operation, gas from the line 51 is forced to flow under pressure into and through the gas inlet tube 22 to the sparge or exit ports 24. The gas exits the gas inlet tube 22 through the sparge ports 24 into the confined volume 70 formed between the weir 40 and the gas inlet tube 22, causing the gas to be dispersed into the continuous liquid phase of the evaporative fluid within the evaporator vessel 30. Generally speaking, gas exiting from the sparge ports 24 mixes with the liquid phase of the evaporative fluid within the confined volume 70 and causes a high volume flow pattern to develop around the weir 40. The velocity of the flow pattern and hence the turbulence associated with the flow pattern is highest within the confined volume 70 and at the locations where the evaporative liquid flows through the upper gap 37 and the lower gap 36 of the weir 40. The turbulence within the confined volumes 70 and 71 significantly enhances the dispersion of the gas into the evaporative fluid which, in turn, provides for efficient heat and mass transfer between the gas and the evaporative fluid. In particular, after exiting the sparge ports 24, the gas is dispersed as a discontinuous phase into a continuous liquid phase of the evaporative fluid forming a gas/liquid mixture within the confined volume 70. The mass per unit volume of the gas/liquid mixture in the confined volume 70 is significantly less than that of the average mass per unit volume of the continuous liquid phase of the evaporative fluid in the volume 71, due to the large difference in mass per unit volume of the liquid compared to the gas, typically on the order of approximately 1000 to 1. This difference in mass per unit volume creates a difference in static hydraulic pressure between the gas/liquid mixture in the confined volume 70 and the liquid phase in the volume 71 at all elevations. This imbalance in static hydraulic pressure forces the evaporative fluid to flow from the higher pressure region, i.e., the volume 71, to the lower pressure region, i.e., the confined volume 70, at a rate that overcomes the impressed static hydraulic pressure imbalance and creates flow upward through the confined volume 70.

Put another way, the dispersion of gas into the evaporative fluid 35 within the confined volume 70 at the sparge ports 24 develops a continuous flow pattern that draws evaporative fluid 35 under the bottom edge 41 of the weir 40 through the lower circulation gap 36, and causes the mixture of gas and evaporative fluid 35 to move through the confined volume 70 and toward the surface 80 of the evaporative fluid 35. Near the surface 80, the gas/liquid mixture reaches a point of balance at which the imbalance of static hydraulic pressure is eliminated. Generally speaking, this point is at or near the tipper circulation gap 37 formed between the second end 42 of the weir 40 and the evaporative fluid surface 80. At the balance point, the force of gravity, which becomes the primary outside force acting on the gas/fluid mixture, gradually reduces the vertical momentum of the gas/liquid mixture to near zero. This reduced vertical momentum, in turn, causes the gas/liquid mixture to flow in a predominantly horizontal direction over the second end 42 of the weir 40 (through the circulation gap 37 defined at or near the surface 80 of the evaporative fluid 35) and into the liquid phase of the evaporative fluid 35 within the volume 71.

This flow pattern around and over the weir 40 affects the dispersion of the gas into the continuous liquid phase of the evaporative fluid 35 and, in particular, thoroughly agitates the continuous liquid phase of the evaporative fluid 35 within the evaporator vessel 30 while creating a substantially horizontal flow pattern of the gas/liquid mixture at and near the surface 80 of the continuous liquid phase of the evaporative fluid 35. This horizontal flow pattern significantly mitigates the potential for entrained liquid droplets to be carried vertically upward along with the dispersed gas phase as the dispersed gas phase rises through the liquid phase due to buoyancy and finally disengages from the continuous liquid phase of the evaporative fluid at the surface 80 of the evaporative fluid 35.

Also, the mixing action created by the induced flow of liquid and liquid/gas mixtures within both the confined volume 70 and the volume 71 hinders the formation of large crystals of precipitates (e.g., salt), which generally requires a quiescent environment. By selectively favoring the production of relatively small incipient particles of precipitates, the mixing action within evaporator vessel 30 helps to ensure that suspended particles formed in the submerged gas evaporation process may be maintained in suspension within the liquid phase circulating around the weir 40, which effectively mitigates the formation of blockages and fouling within the desalination system evaporator 10. Likewise, because relatively small particles that are readily maintained in suspension are formed through precipitation, the efficiency of the evaporator is improved over conventional evaporation systems in terms of freedom from clogging and fouling and the degree to which the feed liquid may be concentrated.

In addition, as the circulating liquid phase within volume 71 approaches the bottom wall 31 of the vessel 30, the liquid phase is forced to flow in a predominantly horizontal direction and through the lower gap 36 into the confined volume 70. This predominantly horizontal flow pattern near the bottom wall 31 of the evaporator vessel 30 creates a scouring action at and above the interior surface of the bottom wall 31 which maintains particles of solids including precipitates in suspension within the circulating liquid while the desalination system is operating. The scouring action at and near the bottom wall 31 of the evaporator vessel 30 also provides means to re-suspend settled particles of solids whenever the desalination system is re-started after having been shutdown for a period of time sufficient to allow suspended particles to settle on or near the bottom wall 31.

As is known, submerged gas evaporation is a process that affects evaporation by contacting a gas with a liquid or liquid mixture, which may be a compound, a solution or slurry. Within a submerged gas evaporator heat and mass transfer operations occur simultaneously at the interface formed by the dynamic boundaries of the discontinuous gas and continuous liquid phases. Thus, all submerged gas evaporators include some method to disperse gas within a continuous liquid phase. The system shown in FIG. 1 however integrates the functions of dispersing the gas into the liquid phase, providing thorough agitation of the liquid phase, and mitigating entrainment of liquid droplets with the gas phase as the gas disengages from the liquid. Additionally, the turbulence and mixing that occurs within the evaporator vessel 30 due to the flow pattern created by dispersion of gas into liquid within the confined volume 70 reduces the formation of large crystals of precipitates and/or large agglomerates of smaller particles within the evaporator vessel 30.

Figure 2:
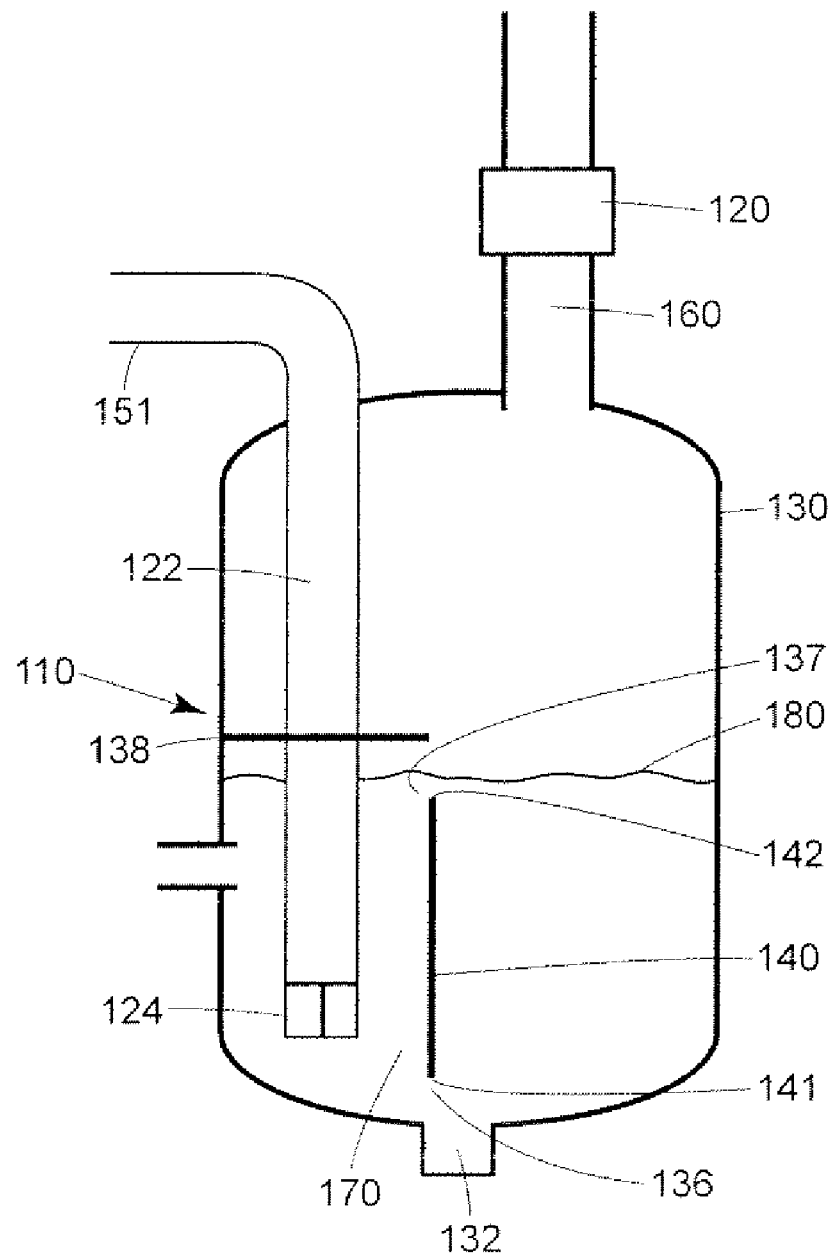
FIG. 2 is a cross-sectional view of a desalination system evaporator including a baffle.

FIG. 2 illustrates a second embodiment of a desalination system evaporator 110, which is very similar to the desalination system evaporator 10 of FIG. 1 and in which elements shown in FIG. 2 are assigned reference numbers being exactly 100 greater than the corresponding elements of FIG. 1. Unlike the device of FIG. 1, the desalination system evaporator 110 includes a baffle or a shield 138 disposed within the evaporator vessel 130 at a location slightly above or slightly below the evaporative fluid surface 180 and above the second end 142 of the weir 140. The baffle or shield 138 may be a generally flat plate shaped and sized to conform generally to the horizontal cross-sectional area of the confined volume 170. Additionally, if desired, the baffle 138 may be mounted to any of the gas inlet tube 122, the evaporator vessel 130 or the weir 140. The baffle 138 augments the force of gravity near the balance point by presenting a physical barrier that abruptly and positively eliminates the vertical components of velocity and hence, momentum, of the gas/liquid mixture, thereby assisting the mixture to flow horizontally outward and over the weir 140 at the upper circulation gap 137. The baffle enhances mitigation of entrained liquid droplets within the gas phase as the gas disengages from the liquid phase. Furthermore, the blower 120 is disposed on the gas exit port 160 in this embodiment thereby providing gas to the evaporation vessel 130 under negative pressure, i.e., via suction.

As will be understood, the weirs 40 and 140 of FIGS. 1 and 2 may be generally flat plates or may be curved plates that surround the gas tubes 22, 122 and/or that extend across the interior of the evaporator vessel 30 between different, such as opposite, sides of the evaporator vessel 30. Basically, the weirs 40 and 140 create a wall within the evaporator vessels 30, 130 defining and separating the volumes 70 and 71 (and 170 and 171). While the weirs 40 and 140 are preferably solid in nature they may, in some cases, be perforated, for instance, with slots or holes to modify the flow pattern within the evaporator vessel 30 or 130, or to attain a particular desired mixing result within the volume 71 or 171 while still providing a substantial barrier between the volumes 70 and 71 or 170 and 171. Additionally, while the weirs 40 and 140 may extend across the evaporator vessels 30 and 130 between opposite walls of the evaporator vessels 30 and 130, they may be formed into any desired shape so long as a substantial vertical barrier is formed to isolate one volume 70 (or 170) closest to the gas inlet tube 22 from the volume 71 (or 171) on the opposite side of the weir 40, 140.

Figure 3:
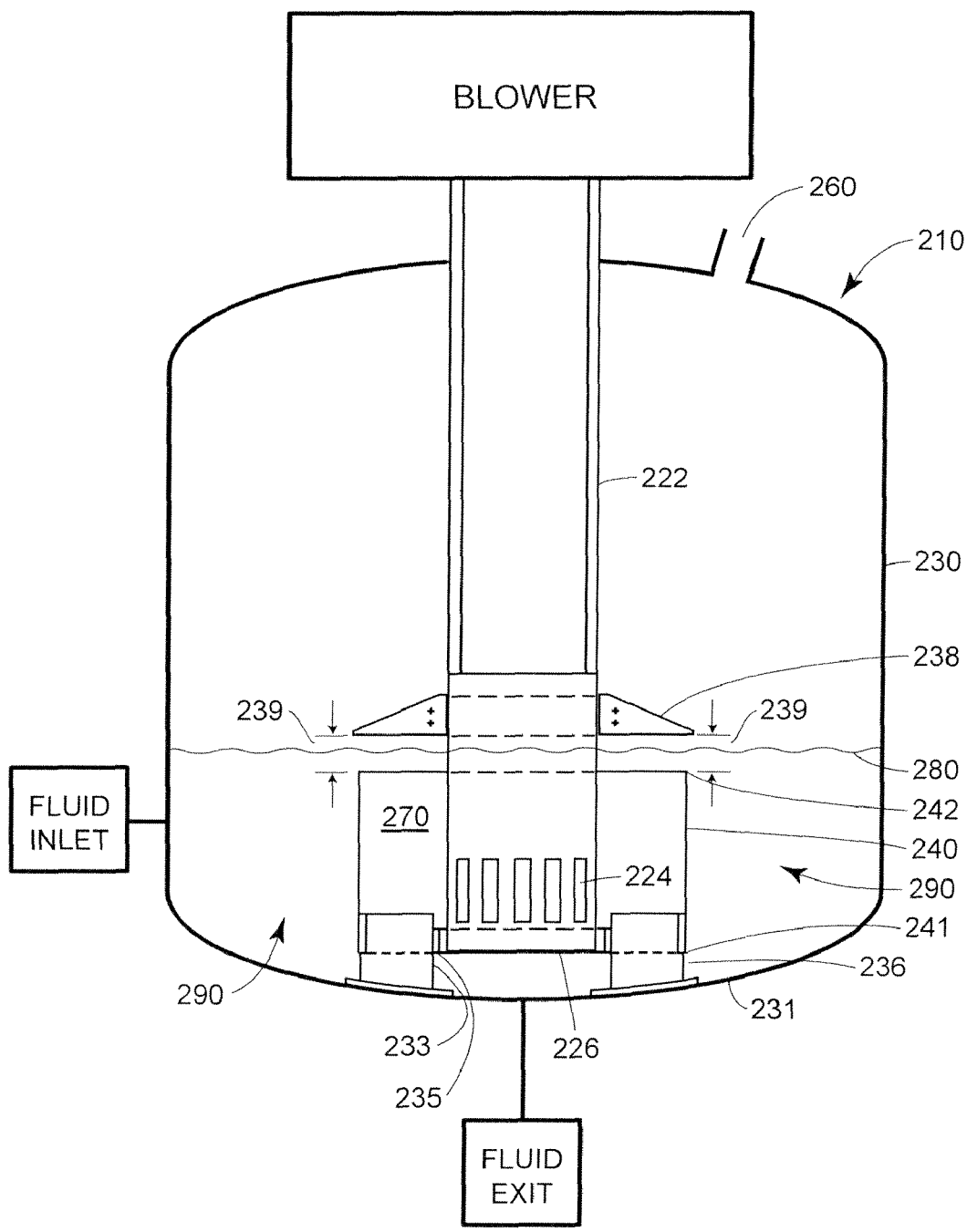
FIG. 3 is a cross-sectional view of a desalination system evaporator having a tubular shaped weir.

FIG. 3 illustrates a cross-sectional view of a further desalination system evaporator 210 having a weir 240 that extends around a gas inlet tube 222. The desalination system evaporator 210, generally speaking, has evaporative capacity equivalent to approximately 10,000 gallons per day on the basis of evaporating water from an evaporative liquid. A fan/blower (not shown in FIG. 3) delivers hot gas which could be approximately 12,300 actual cubic feet per minute (acfm) at 1,400° F. to the gas inlet tube 222. While the dimensions of the desalination system evaporator 210 are exemplary only, the ratios between these dimensions may serve as a guide for those skilled in the art to achieve a desirable balance between three desirable evaporation results including: 1) preventing the formation of large crystals of precipitates and/or agglomerates of solid particles while maintaining solid particles as a homogeneous suspension within the process liquid by controlling the degree of overall mixing within vessel 230; 2) enhancing the rates of heat and mass transfer by controlling the turbulence and hence interfacial surface area created between the gas and liquid phases within confined volume 270; and 3) mitigating the potential of entraining liquid droplets in the gas as the gas stream disengages from the liquid phase at the liquid surface 280 by maintaining a desirable and predominately horizontal velocity component for the gas/liquid mixture flowing outward over the second end 242 of the weir 240 and along the surface of the evaporative liquid 280 within evaporator vessel 230. As illustrated in FIG. 3, the desalination system evaporator 210 includes an evaporator vessel 230 with a dished bottom having an interior volume and a vertical gas inlet tube 222 at least partially disposed within the interior volume of the evaporator vessel 230. In this case, the gas inlet tube 222 has a diameter of approximately 20 inches and the overall diameter of the evaporation vessel 230 is approximately 120 inches, but these diameters may be more or less based on the design capacity and desired process result as relates to both gas and liquid flow rates and the type of combustion device (not shown in FIG. 3) supplying hot gas to the desalination system evaporator 320.

In this example the weir 240 has a diameter of approximately 40 inches with vertical walls approximately 26 inches in length. Thus, the weir 240 forms an annular confined volume 270 within the evaporation vessel 230 between the inner wall of the weir 240 and the outer wall of the gas inlet tube 222 of approximately 6.54 cubic feet. In the embodiment of FIG. 3, twelve sparge ports 224 are disposed near the bottom of the gas inlet tube 222. The sparge ports 224 are substantially rectangular in shape and are, in this example, each approximately 3 inches wide by 7¼ inches high or approximately 0.151 ft$^2$ in area for a combined total area of approximately 1.81 ft$^2$ for all twelve sparge ports 224.

As will be understood, the gas exits the gas inlet tube 222 through the sparge ports 224 into a confined volume 270 formed between the gas inlet tube 222 and a tubular shaped weir 240. In this case, the weir 240 has a circular cross-sectional shape and encircles the lower end of the gas inlet tube 222. Additionally, the weir 240 is located at an elevation which creates a lower circulation gap 236 of approximately 4 inches between a first end 241 of the weir 240 and a bottom dished surface 231 of the evaporator vessel 230. The second end 242 of the weir 240 is located at an elevation below a normal or at rest operating level of the evaporative fluid within the evaporator vessel 230. Further, a baffle or shield 238 is disposed within the evaporator vessel 230 approximately 8 inches above the second end 242 of the weir 240. The baffle 238 is circular in shape and extends radially outwardly from the gas inlet tube 222. Additionally, the baffle 238 is illustrated as having an outer diameter somewhat greater than the outer diameter of the weir 240 which, in this case, is approximately 46 inches. However, the baffle 238 may have the same, a greater or smaller diameter than the diameter of the weir 240 if desired. Several support brackets 233 are mounted to the bottom surface 231 of the evaporator vessel 230 and are attached to the weir 240 near the first end 241 of the weir 240. Additionally, a gas inlet tube stabilizer ring 235 is attached to the support brackets 233 and substantially surrounds the bottom end 226 of the gas inlet lube 222 to stabilize the gas inlet tube 222 during operation.

During operation of the desalination system evaporator 210, the gases are ejected through the sparge ports 224 into the confined volume 270 between the outer wall of the gas inlet tube 222 and the inside wall of the weir 242 creating a mixture of gas and liquid within the confined volume 270 that is significantly reduced in bulk density compared to the average bulk density of the fluid located in the volume 290 outside of the wall of the weir 240. This reduction in bulk density of the gas/liquid mixture within confined volume 270 creates an imbalance in head pressure at all elevations between the surface 280 of the evaporative liquid within the evaporator vessel 230 and the first end 241 of the weir 240 when comparing the head pressure within the confined volume 270 and head pressure within the volume 290 outside of the wall of the weir 240 at equal elevations. The reduced head pressure within the confined volume 270 induces a flow pattern of liquid from the higher head pressure regions of volume 290 through the circulation gap 236 and into the confined volume 270. Once established, this induced flow pattern provides vigorous mixing action both within the confined volume 270 and throughout the volume 290 as evaporative liquid from the surface 280 and all locations within the volume 290 is drawn downward through the circulation gap 236 and upward due to buoyancy through the confined volume 270 where the gas/liquid mixture flows outward over the second end 242 of the weir 240 and over the surface 280 confined within the evaporator vessel 230.

Within confined volume 270, the induced flow pattern and resultant vigorous mixing action creates significant shearing forces that are primarily based on the gross difference in specific gravity and hence momentum vectors between the liquid and gas phases at all points on the interfacial surface area of the liquid and gas phases. The shearing forces driven by the significant difference in specific gravity between the liquid and gas phases, which is, generally speaking, of a magnitude of 1000:1 liquid to gas, cause the interfacial surface area between the gas and liquid phases to increase significantly as the average volume of each discrete gas region within the mixture becomes smaller and smaller due to the shearing force of the flowing liquid phase. Thus, as a result of the induced flow pattern and the associated vigorous mixing within the confined area 270, the total interfacial surface area increases as the gas/liquid mixture flows upward within confined volume 270. This increase in interfacial surface area or total contact area between the gas and liquid phases favors increased rates of heat and mass transfer between constituents of the gas and liquid phases as the gas/liquid mixture flows upward within confined volume 270 and outward over the second end 242 of the weir 240.

At the point where gas/liquid mixture flowing upward within confined volume 270 reaches the elevation of tire evaporative fluid surface 280 and having passed beyond the second edge 242 of the weir 240, the difference in head pressure between the gas/liquid mixture within the confined volume 270 and the liquid within volume 290 fluid is eliminated. Absent the driving force of differential head pressure and the confining effect of the weir 240, gravity and the resultant buoyancy of the gas phase within the liquid phase become the primary outside forces affecting the continuing flow patterns of the gas/liquid mixture exiting the confined space 270. The combination of the force of gravity and the impenetrable barrier created by the baffle 238 eliminates the vertical velocity and momentum components of the flowing gas/liquid mixture at or below the elevation of the bottom of the baffle 238 and causes the velocity and momentum vectors of the flowing gas/liquid mixture to be directed outward through the gap 239 created by the second end 242 of the weir 240 and the bottom surface of the baffle 238 and downwards near the surface 280 within the evaporator vessel 230 causing the continuing flow pattern of the gas/liquid mixture to assume a predominantly horizontal direction. As the gas/liquid mixture flows outwards in a predominantly horizontal direction, the horizontal velocity component continually decreases causing a continual reduction in momentum and a reduction of the resultant shearing forces acting at the interfacial area within the gas/liquid mixture. The reduction in momentum and resultant shearing forces allows the force of buoyancy to become the primary driving force directing the movement of the discontinuous gas regions within the gas/liquid mixture, which causes discrete and discontinuous regions of gas to coalesce and ascend vertically within the continuous liquid phase. As the ascending gas regions within the gas/liquid mixture reach the surface 280 of the evaporative liquid within the evaporator vessel 230, buoyancy causes the discontinuous gas phase to break through the surface 280 and to coalesce into a continuous gas phase that is directed upward within the confines of the evaporator vessel 230 and into the vapor exhaust duct 260 under the influence of the differential pressure created by the fan/blower (not shown in FIG. 3) supplying gas to the desalination system evaporator 210.

Figure 4:
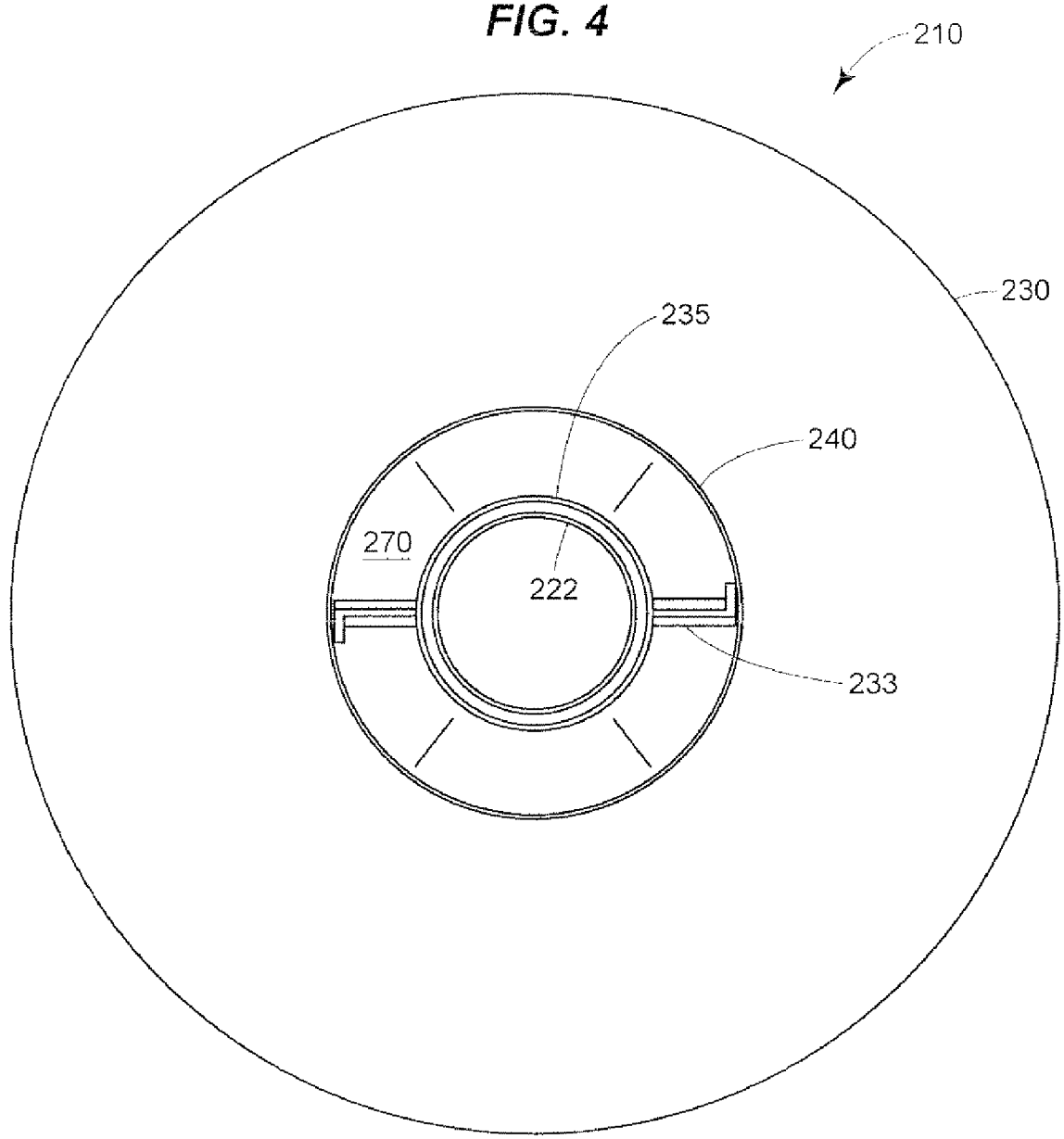
FIG. 4 is a top plan view of the desalination system evaporator of FIG. 3.

FIG. 4 is a top plan view of the desalination system evaporator 210 of FIG. 3 illustrating the tubular nature of the weir 240. Specifically, the generally circular gas inlet tube 222 is centrally located and is surrounded by the stabilizer ring 235. In this embodiment, the stabilizer ring 235 surrounds the gas inlet tube 222 and essentially restricts any significant lateral movement of the gas inlet tube 222 due to surging or vibration such as might occur upon startup of the system. While the stabilizer ring 235 of FIG. 4 is attached to the support brackets 233 at two locations, more or fewer support brackets 233 may be employed without affecting the function of the desalination system evaporator 210. The weir 240, which surrounds the gas inlet tube 222 and the stabilizer ring 235, and is disposed co-axially to the gas inlet tube 222 and the stabilizer ring 235, is also attached to, and is supported by the support brackets 233. In this embodiment, the confined volume 270 is formed between the weir 240 and the gas inlet tube 222 while the second volume 290 is formed between the weir 240 and the side walls of the evaporator vessel 230. As will be understood, in this embodiment, the introduction of the gas from the exit ports 224 of the gas inlet tube 220 causes evaporative fluid to flow in an essentially toroidal pattern around the weir 240.

Some design factors relating to the design of the desalination system evaporator 210 illustrated in FIGS. 3 and 4 are summarized below and may be useful in designing larger or smaller desalination system evaporators. The shape of the cross sectional area and length of the gas inlet tube is generally set by the allowable pressure drop, the configuration of the evaporator vessel, the costs of forming suitable material to match the desired cross sectional area, and the characteristics of the fan/blower that is coupled to the desalination system evaporator. However, it is desirable that the outer wall of the gas inlet tube 222 provides adequate surface area for openings of the desired shape and size of the sparge ports which in turn admit the gas to the confined volume 290. For a typical desalination system evaporator the vertical distance between the top edge 242 of the weir 240 and the top edge of the sparge ports should be not less than about 6 inches and preferably is at least about 17 inches. Selecting the shape and, more particularly, the size of the sparge port 224 openings is a balance between allowable pressure drop and the initial amount of interfacial area created at the point where the gas is dispersed into the flowing liquid phase within confined volume 290. The open area of the sparge ports 224 is generally more important than the shape, which can be most any configuration including, hut not limited to, rectangular, trapezoidal, triangular, round, oval. In general, the open area of tire sparge ports 224 should be such that the ratio of gas flow to total combined open area of all sparge ports should at least be in the range of 1,000 to 18,000 acfm per ft², preferably in the range of 2,000 to 8,000 acfm/ft² and more preferably in the range of 2,000 to 8,000 acfm/ft², where acfm is referenced to the operating temperature within the gas inlet tube. Likewise, the ratio of the gas flow to the cross sectional area of the confined volume 270 should be at least in the range of 400 to 10,000 scfm/ft², preferably in the range of 500 to 4,000 scfm/ft² and more preferably in the range of 500 to 2,000 scfm/ft². Additionally, the ratio of the cross sectional area of the evaporator vessel 230 to the cross sectional area of the confined volume 270 (($CSA_{vessel}$) is preferably in the range from three to one (3.0:1) to two-hundred to one (200:1), is more preferably in the range from eight to one (8.0:1) to one-hundred to one (100:1) and is highly preferably in the range of about ten to one (10:1) to fourteen to one (14:1). These ratios are summarized in the table below. Of course, in some circumstances, other ratios for these design criteria could be used as well or instead of those particularly described herein.

TABLE 1

| Ratios | Preferred Embodiment | Acceptable Range | Preferred Range |
|---|---|---|---|
| acfm:Total/$CSA_{sparge\ ports}$ | 2,000-8,000 acfm/ft² | 1,000-18,000 acfm/ft² | 2,000-10,000 acfm/ft² |
| scfm:/$CSA_{confined\ volume}$ | 500-2,000 scfm/ft² | 400-10,000 scfm/ft² | 500-4,000 scfm/ft² |
| $CSA_{vessel}$/$CSA_{confined\ volume}$: | 10:1-14:1 | 3.0:1-200:1 | 8.0:1-100:1 |

Figure 5:
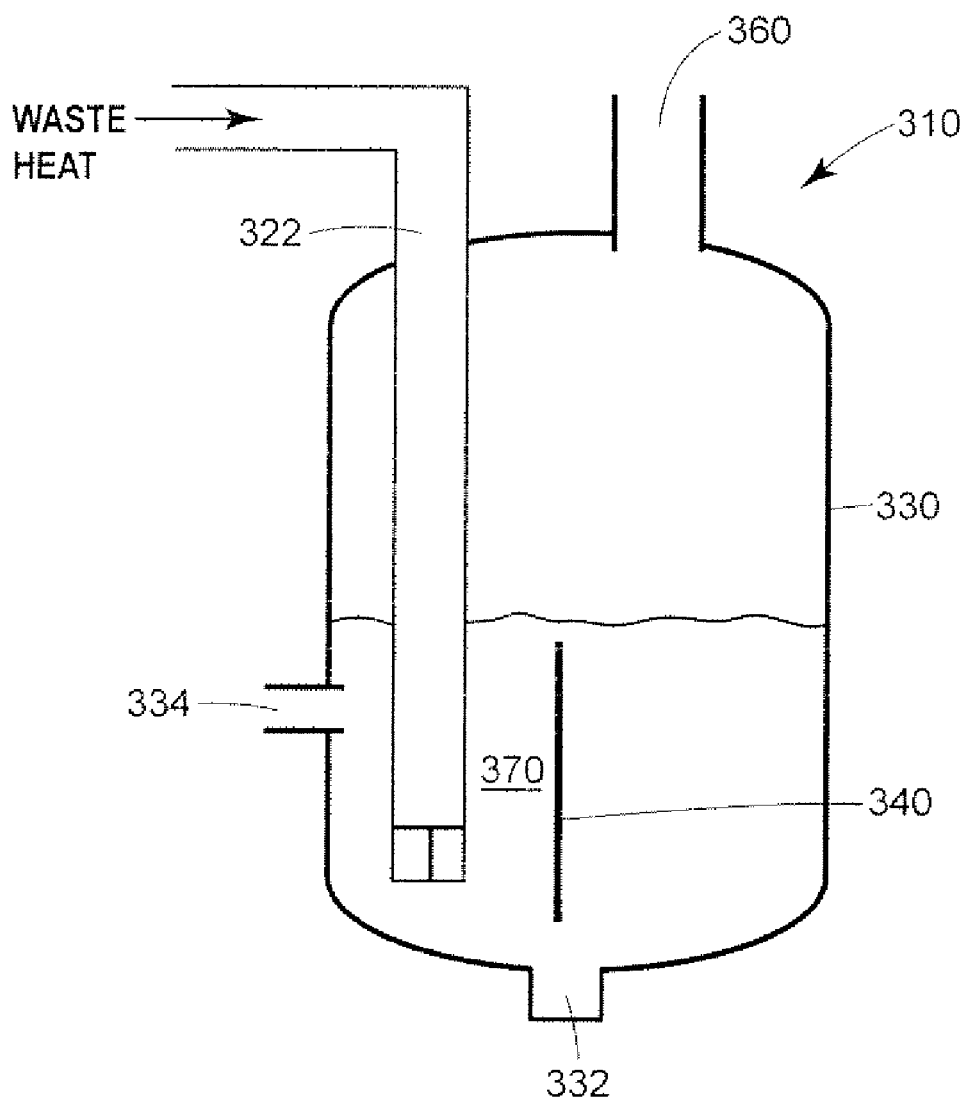
FIG. 5 is a cross-sectional view of a desalination system evaporator connected to a source of waste heat.

Turning now to FIG. 5, a desalination system evaporator is shown which is similar to the desalination system evaporator of FIG. 1, and in which like components are labeled with numbers exactly 300 greater than the corresponding elements of FIG. 1. The desalination system evaporator 310 of FIG. 5 receives hot gases directly from an external source. The hot gases supplied by the external source may include gases having a wide range of temperature and/or specific components and these hot gases may be selected by one skilled in the art to achieve any specific rate of evaporation.

Figure 6:
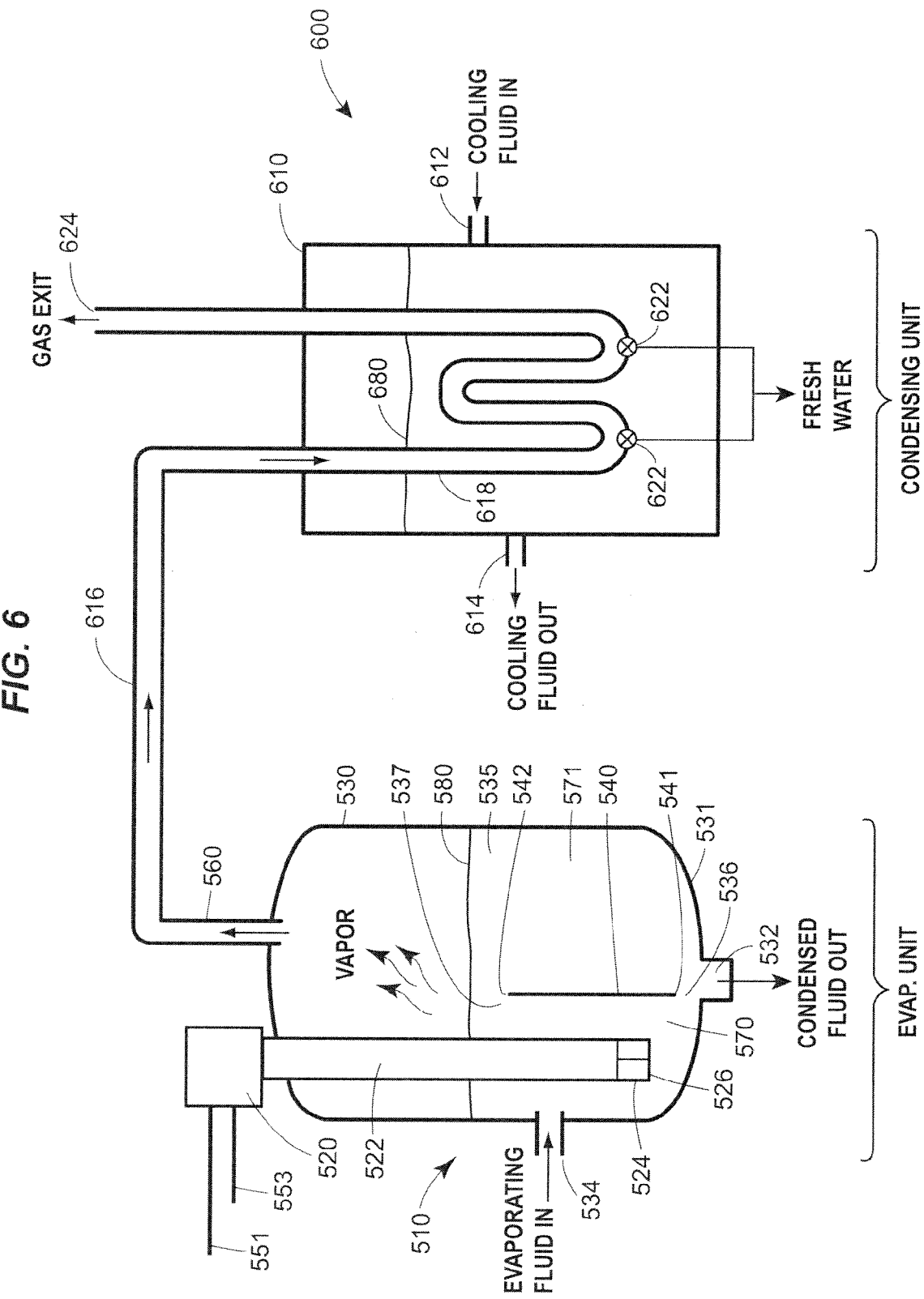
FIG. 6 is a cross-sectional view of a desalination system including a cooling/condensing unit.

FIG. 6 illustrates a desalination system evaporator 510 which is similar to the desalination system evaporators of FIGS. 1, 2 and 5, in which like elements are labeled with reference numbers exactly 500 greater than those of FIG. 1. However, the desalination system evaporator 510 is connected to a condensing unit 600 thereby forming a desalination system. The condensing unit 600 includes a condensing vessel 610 having a cooling fluid input port 612 and a cooling fluid exit port 614. Vapor travels from the desalination system evaporator 510 through the gas exit port 560 along a transfer tube 616 and into a condensing tube 618 that is partially disposed within the condensing vessel 610. Within the condensing vessel 610, the condensing tube 618 is partially submerged in a cooling fluid which has a surface 680. The submerged portion of the condensing tube 618 allows heat transfer from the vapor within the condensing tube 618 to the cooling fluid, thus allowing the vapor the vapor to condense. Accordingly, the condensed liquid accumulates at the lowest points of the condensing tube where the condensed liquid may be removed via one or more removal valves 622.

Figure 7:
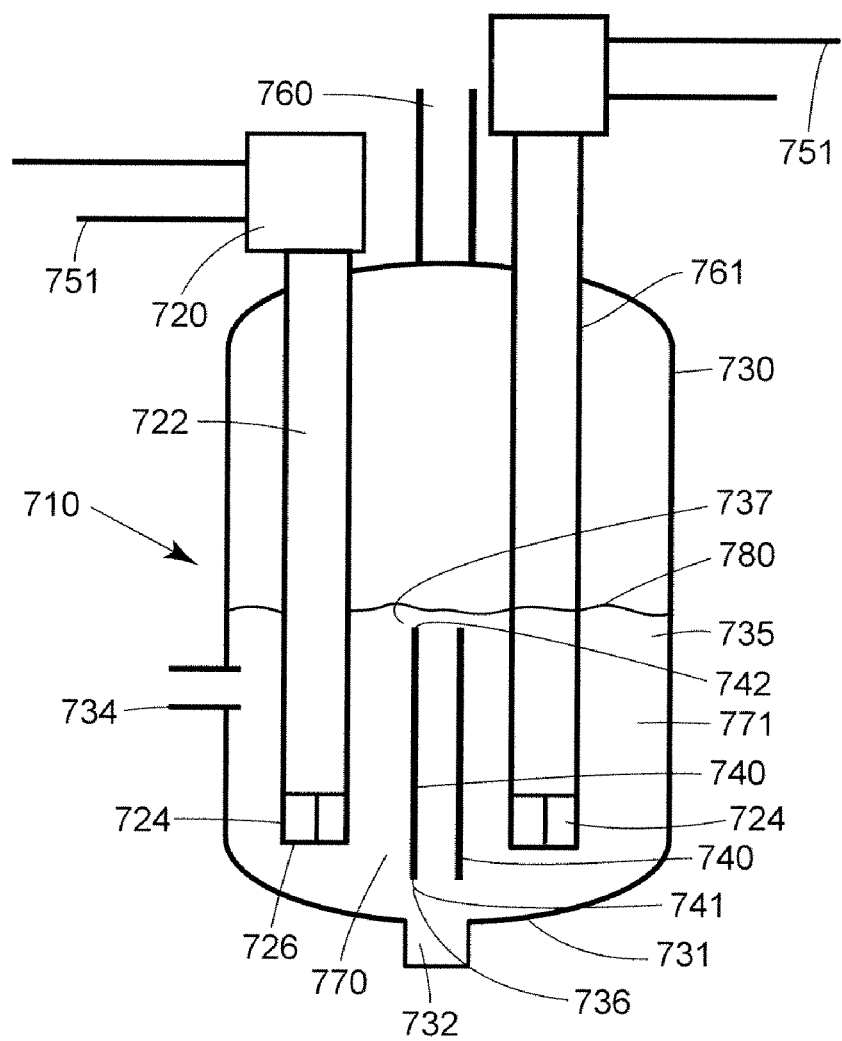
FIG. 7 is a cross-sectional view of a desalination system evaporator having multiple weirs and multiple gas inlet tubes.

The embodiment of a desalination system evaporator 710 shown in FIG. 7 includes multiple gas tubes 722 and multiple weirs 740. The evaporator vessel 730 may include more than one gas tube 722 and/or more than one weir 740 to increase desalinating capability without a significant increase in the size of the evaporator vessel 710.

In a desalination system, the evaporative fluid introduced into the evaporation vessel 510 is generally salt water or brine. Concentrated brine may be removed through the outlet port 532. As hot gas is introduced through the supply tube 522 and mixed with the brine, water vapor is absorbed by the hot gas and carried out of the evaporation vessel through the gas exit port 560. Through the positive (or negative) pressure imparted to the hot gas via the fan/blower, the vapor is forced (or drawn) through the transfer pipe 616 and into the condensing vessel 610. This movement may be facilitated by one or more fans or pumps located in the gas exit 624. Regardless, as the vapor traverses the condensing tube 618, the vapor cools as a result of heat transfer through the condensing tube 618 walls to the cooling fluid. As a result of vapor cooling, the ability of the vapor to retain water will decrease to the point of saturation. Thereafter, water will precipitate out of the vapor and collect in the condensing tube 618. The amount of precipitated water will depend on the amount of cooling performed in the evaporation vessel and the entry temperature of the vapor. The precipitated water may be removed from the condensing tube through the wafer removal valves 622.

The embodiment of a desalination system evaporator 710 shown in FIG. 8 includes multiple gas tubes 722 and multiple weirs 740. The evaporator vessel 730 may include more than one gas tube 722 and/or more than one weir 740 to increase cooling capability without a significant increase in the size of the desalination system evaporator 710.

The desalination system described above has many advantages over known desalination systems. For example, a desalination system as described above has virtually no moving parts and no heat transfer surfaces in the evaporation unit. Thus, maintenance and replacement are greatly reduced. The disclosed desalination system is scalable to accommodate virtually any required fresh water output. Additionally, readily available heat sources and brine sources may be used. For example, solar energy could be used to heat the input gas and seawater could be used for the brine. When operated on solar energy the energy requirement would be significantly less than that that for conventional systems. In addition, the seawater could be used as both the cooling fluid in the condensing vessel and as the evaporative liquid in the evaporator vessel. These and many other advantages may be realized with the desalination system described herein.

Desalination systems according to the disclosure operate at higher percentages of suspended solids and/or the ability to use cooling fluids with higher concentrations of dissolved solids (due in part to the turbulent flow described above). Thus, desalination systems according to the disclosure can be used to desalinate brackish water that has very high concentrations of contaminants and also require less preventative maintenance (i.e., cleaning due to chemical residue buildup and/or precipitate coating of internal surfaces) than conventional desalination systems.

It will be understood that, because the weir and gas dispersion configurations within desalination system evaporators illustrated in the embodiments of FIGS. 1-8 provide for a high degree of mixing, induced turbulent flow and the resultant intimate contact between liquid and gas within the confined volumes 70, 170, 270, etc., the desalination system evaporators of FIGS. 1-8 create a large interfacial surface area for the interaction of the evaporative fluid and the gas provided via die gas inlet tube, leading to very efficient heat and mass transfer between gas and liquid phases. Furthermore, the use of the weir and, if desired, the baffle, to cause a predominantly horizontal flow pattern of the gas/liquid mixture at the surface of the evaporative fluid mixture mitigates or eliminates the entrainment of droplets of evaporative fluid within the exhaust gas. Still further, the high degree of turbulent flow within the evaporator vessel mitigates or reduces the formation of large crystals or agglomerates and maintains the mixture of solids and liquids within the evaporator vessel in a homogeneous state to prevent or reduce settling of precipitated solids. This factor, in turn, reduces or eliminates the need to frequently clean the evaporator vessel and allows the evaporation to proceed to a very high state of concentration by maintaining precipitates in suspension. In the event that such solids do form, however, they may be removed via the outlet port 32 (FIG. 1) using a conventional valve arrangement.

While several of different types of desalination system evaporators having different weir configurations are illustrated herein, it will be understood that the shapes and configurations of the components, including the weirs, baffles and gas entry ports, used in these devices could be varied or altered as desired. Thus, for example, while the gas inlet tubes are illustrated as being circular in cross section, these tubes could be of any desired cross sectional shape including, for example, square, rectangular, oval, etc. Additionally, while the weirs illustrated herein have been shown as flat plates or as tubular members having a circular cross-sectional shape, weirs of other shapes or configurations could be used as well, including weirs having a square, rectangular, oval, or other cross sectional shape disposed around a fire or other gas inlet tube, weirs being curved, arcuate, or multi-faceted in shape or having one or more walls disposed partially around a fire or gas inlet tube, etc. Also, the gas entry ports shown as rectangular may assume most any shape including trapezoidal, triangular, circular, oval, or triangular.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A desalination system comprising:
    a desalination system evaporator comprising:
        a first vessel having an interior adapted to hold a liquid;
        a tube disposed within the first vessel and adapted to transport a gas into the interior of the first vessel;
        a weir disposed within the first vessel adjacent the tube in a manner that defines a confined volume between the tube and the weir;
        a vapor pipe adapted to transport exhaust vapor from the interior of the first vessel; and
        a liquid inlet adapted to supply a liquid to the interior of the first vessel;
        wherein the weir includes a first weir end and a second weir end and is disposed within the vessel to define a first circulation gap between the first weir end and a first wall of the first vessel and to define a second circulation gap between the second weir end and a second wall of the first vessel which enables liquid within the first vessel to flow through the first and second circulation gaps when gas is introduced into the first vessel from the tube; and
    a condensing unit comprising:
        a second vessel having an inlet and an outlet for supplying a cooling fluid;
        a vapor pipe passing through the second vessel and at least partially surrounded by the cooling fluid within the second vessel;
        a liquid collection and exit port for removing condensed liquid from the second vessel.

2. The desalination system of claim 1, further including a baffle disposed in the first vessel proximate the second circulation gap and generally perpendicular to the weir.

3. The desalination system of claim 2, wherein the liquid is one of seawater and brine.

4. The desalination system of claim 2, wherein condensed liquid is periodically removed through a removal port in the second vessel.

5. The desalination system of claim 1, wherein the tube includes a gas exit disposed below a surface of the liquid when liquid is disposed within the first vessel.

6. The desalination system of claim 5, further including a plurality of gas exits disposed in the tube, wherein each gas exit is substantially rectangular in shape.

7. The desalination system of claim 6, wherein a ratio of gas flow in actual cubic feet per minute (acfm) out of the tube as measured at the operating temperature of the gas flowing within the tube to a cross sectional area of gas exit slots in the tube is in the range of approximately 1,000 acfm/ft$^2$ to approximately 18,000 acfm/ft$^2$.

8. The desalination system of claim 6, wherein the ratio of gas flow in actual cubic feet per minute (acfm) out of the tube as measured at the operating temperature of the gas within the tube to the cross sectional area of gas exit slots in the tube is in the range of approximately 2,000 acfm/ft$^2$ to approximately 8,000 acfm/ft$^2$.

9. The desalination system of claim 1, further including a reinforcing plate attached to the first vessel and attached to the weir.

10. The desalination system of claim 9, further including a stabilizer ring attached to the reinforcing plate and disposed between the tube and the weir.

11. The desalination system of claim 1, wherein a ratio of gas flow in standard cubic feet per minute (scfm) out of the tube to a cross sectional area of a confined volume in the first vessel is in the range of approximately 400 scfm/ft$^2$ to approximately 10,000 scfm/ft$^2$.

12. The desalination system of claim 11, wherein the ratio of gas flow in scfm out of the tube to a cross sectional area of the confined volume is in the range of approximately 500 scfm/ft$^2$ to approximately 2,000 scfm/ft$^2$.

13. The desalination system of claim 1, wherein a ratio of a cross sectional area of the first vessel to a cross sectional area of the confined volume is in the range of approximately 3 to 1 to approximately 200 to 1.

14. The desalination system of claim 13, wherein the ratio of a cross sectional area of the confined volume to a cross sectional area of the first vessel is in the range of approximately 10 to 1 to approximately 14 to 1.

15. The desalination system of claim 1, wherein the weir comprises a tubular member disposed around the tube.

16. The desalination system of claim 15, wherein the tubular member is circular in cross section.

17. The desalination system of claim 15, wherein the tubular member is disposed co-axial to the tube.

18. The desalination system of claim 1, wherein the weir comprises a generally flat plate member.

19. The desalination system of claim 1, wherein the tube is connected to a source of waste heat.

20. The desalination system of claim 1 wherein the gas is supplied to the first vessel under positive pressure.

21. The desalination system of claim 1 wherein the gas is supplied to the first vessel under negative pressure.

22. The desalination system of claim 1 further comprising a demister to remove entrained liquid droplets from the gas before the gas exits the first vessel.

23. The desalination system of claim 22 wherein the demister is a vane-type demister.

24. The desalination system of claim 22 wherein the demister is a mesh pad-type demister.

25. The desalination system of claim 22 wherein the demister is a combination of a vane-type demister and a mesh pad-type demister.

26. The desalination system of claim 22 wherein the demister is a vane-type demister having a coalescing filter.

27. The desalination system of claim 1 further comprising a plurality of gas tubes in the first vessel.

28. The desalination system of claim 1 further comprising a plurality of weirs in the first vessel.

29. The desalination system of claim 1 further comprising a plurality of blowers in the first vessel.

\* \* \* \* \*